May 10, 1932.    C. D. HOWEY    1,858,089
STACKER
Filed June 3, 1931    3 Sheets-Sheet 1
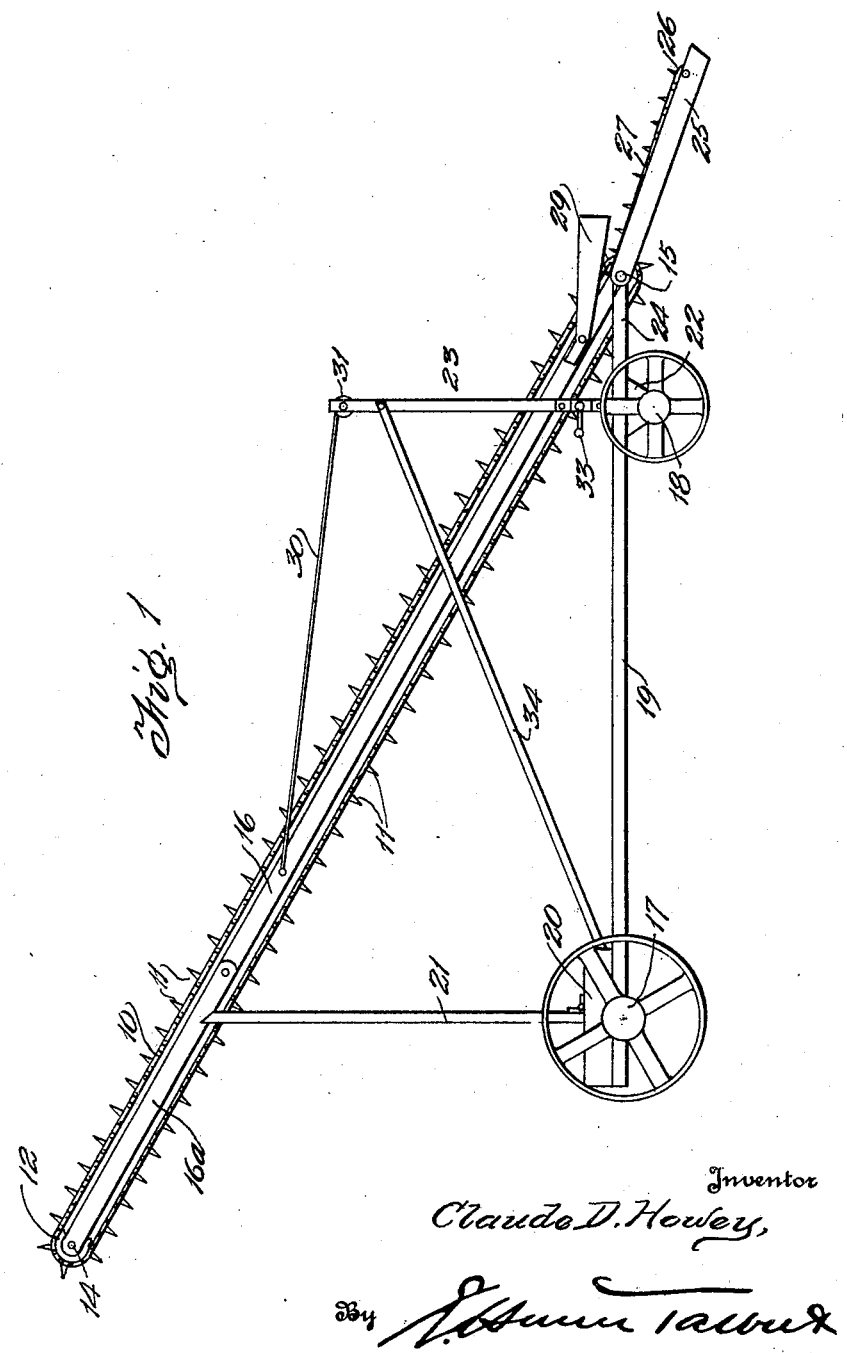
Inventor
Claude D. Howey,
By
Attorney May 10, 1932.                C. D. HOWEY                    1,858,089
                              STACKER
                         Filed June 3, 1931          3 Sheets-Sheet 2
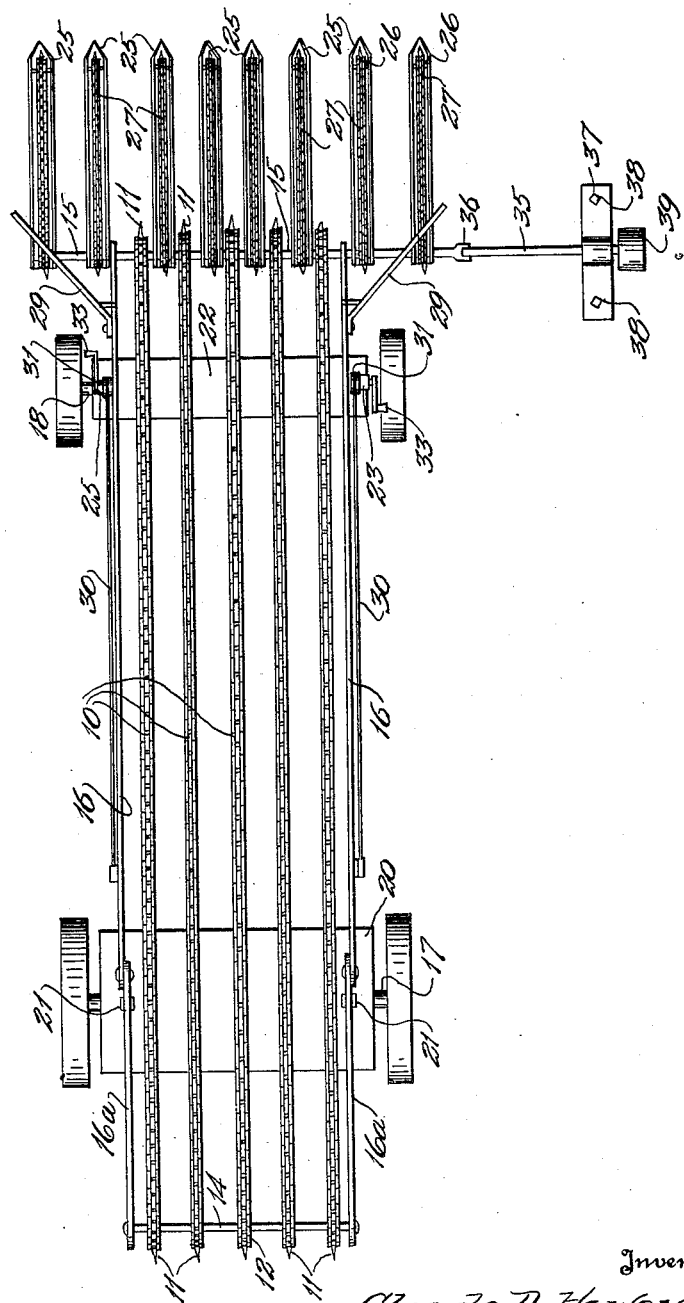
Inventor
Claude D. Howey,
By
Attorney May 10, 1932.　　　C. D. HOWEY　　　1,858,089
STACKER
Filed June 3, 1931　　　3 Sheets-Sheet 3
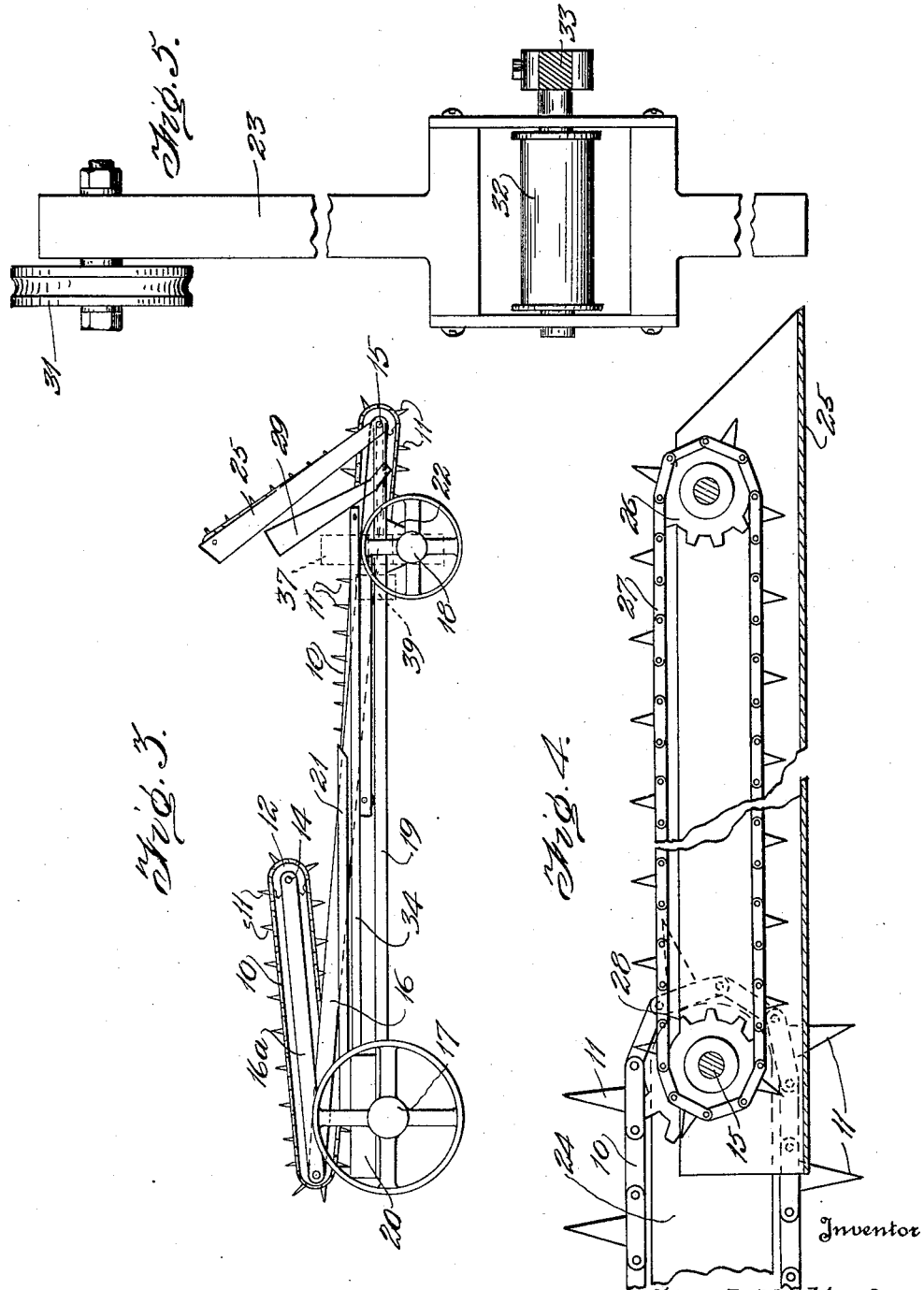

Patented May 10, 1932

1,858,089

UNITED STATES PATENT OFFICE

CLAUDE D. HOWEY, OF NEWCASTLE, WYOMING

STACKER

Application filed June 3, 1931. Serial No. 541,906.

The object of the invention is to provide a stacker of the portable variety, so that it may be transported from place to place and positioned to receive the material to be stacked direct from a bull rake; to provide a machine of this character which, when set up, may be power driven by the engine of a motor vehicle or by any portable power plant; to provide a construction which may be readily collapsed into condensed form for easy transportation from point to point; and generally to provide a machine or apparatus of this character which is of simple form and therefore susceptible of cheap manufacture and the easy replacement of worn or broken parts.

With this object in view, the invention consists in a construction and combination of parts of which a preferred embodiment is illustrated in the accompanying drawings, wherein:

Figure 1 is a side elevational view of the invention.

Figure 2 is a top plan view.

Figure 3 is a view similar to Figure 1 but showing the invention in collapsed position, as when it is to be transported.

Figure 4 is a detailed elevational view of the pivotal mounting of one of the tines.

Figure 5 is a detailed elevational view of one of the uprights.

The stacker proper consists of uniformly spaced parallel chains 10 provided with teeth 11, the chains being trained over sprockets 12 rotatably mounted on shafts 14 and 15 disposed respectively at the opposite ends of the stacker frame for which they constitute spacers as well as tie rods between the side rails 16, the rails 16 and the shafts 14 and 15 constituting the frame.

The stacker frame, or frame proper, is carried on a vehicular apparatus of which the rear and forward axles 17 and 18 are connected by means of a reach 19, the rear axle carrying a bolster 20 at the opposite ends of which are hingedly connected the foldable uprights 21, these being designed to support the stacker frame at the rear end when the latter is in extended or elevated position. The forward bolster 22 carries foldable uprights 23 mounted on it in a manner similar to the mounting of the uprights on the bolster 20, but this forward bolster has forwardly projecting bearing arms 24 having bearings in which the shaft 15 is journalled. This shaft exceeds in length the width of the stacker frame so that it extends laterally on opposite sides of said frame and throughout its length is provided with a series of uniformly spaced tines 25, these tines being loosely mounted on the shaft so that their free ends may rest upon the ground when the stacker is in operative position. Each tine is generally of channel form and carries adjacent its free end a sprocket 26 over which is trained a toothed chain 27, the latter being also trained over a corresponding sprocket 28 mounted on the shaft 15. Throughout the width of the stacker frame, the sprockets 28 are disposed in intercurrent relation with the sprockets 14, being uniformly spaced along the laterally extending portions of the shaft 15.

Lateral guard members 29 are carried on the side rails 16 and extend to the free ends of the shaft 15 so as to direct any material received on the tines 25 to the stacker chains 10.

By reason of the pivotal mounting of the stacker, it may be elevated to an inclined position as shown in Figure 1 or dropped to a horizontal position as shown in Figure 3, in which latter position it will rest on the rear bolster 20. The elevation from the horizontal to the inclined position is effected through the instrumentality of cables 30 terminally secured to the side rails 16 and trained over pulleys 31 at the upper ends of the uprights 23, being reeled on drums 32 rotatably mounted on the uprights and actuated by means of hand cranks 33. In their folded position, the uprights 23 lie transversely of the stacker frame or in parallelism with the forward bolster and when swung to upright position they are retained in the latter by means of brace rods 34 swingingly connected to the rear bolster 20 at its ends and having detachable connections with the uprights 23 adjacent their upper ends.

Since the rear of the stacker frame extends materially beyond the rear end of the vehicular apparatus, it is expedient to have this extending portion made foldable so as to reduce the over-all length of the machine when not in use or when it is to be transported. Accordingly the side rails 16 are of sectional form with the sections 16ª hingedly connected to the main sections. The main sections are thus substantially the length of the vehicular apparatus and when lowered onto the bolster 20, the sections 16ª are folded down onto them in parallelism therewith. The cables 30 serve to support the main or body portions of the side rails when the stacker is extended or elevated but the uprights 21 serve as a support for the extension section embodying the rail sections 16ª, these being disposed in abutting position to the underside of the rail section 16ª just beyond the hinge connections. In the folded position, the uprights 21 are folded down over the stacker before the extension section is folded down on the main or body section. In this position, these uprights act as members around which the stacker chains may fold in the folding of the extension section.

In the folded position, the tines 25 are likewise folded, merely by swinging them over on their loose connections with the shaft 15. Those tines between the side rails 15 being then supported by the front bolster while those on the laterally extending portions of the shaft 15 are supported by the guides 29.

In the extended position, the stacker is actuated from some exterior source, as by a portable power plant of the engine of a motor vehicle and to this end there is provided a drive shaft 35 having a universal connection 36 with the shaft 15, the remote or free end of the drive shaft being journalled in the pillar block 37 designed to be staked into position as by stakes 38. A pulley 39 is provided on the shaft 35 for the application of a belt for power to be communicated from the driving source. By reason of the universal connection 36, the drive shaft is susceptible of being folded laterally against the apparatus when not in use when the stakes 38 have been withdrawn so that the pillar block may be disposed on the apparatus.

In the extended or operative position, with the power shaft 35 rotating, both the stacker chains 10 and tine chains 27 are set in motion and the material delivered to the tines by bull rakes is gathered up by the tine chains from which it is transferred to the stacker chains and from the latter over the upper end of the stacker to be deposited in a convenient stack in the rear of the apparatus.

The invention having been described, what is claimed as new and useful is:

A stacker comprising an inclined frame, a series of spaced chains traversing the frame and provided with teeth, and tines carried at the lower end of the frame and themselves provided with toothed chains driven in unison with the stacker chains, a vehicular apparatus on which the stacker frame is pivotally mounted, and means for elevating the stacker frame to inclined position or lowering it onto the vehicular apparatus, said means comprising standards, cables trained over pulleys at the upper ends of the standards and anchored one end to the stacker frame, and reels mounted on the standards to which the other ends of the cables are secured, the stacker frame embodying a foldable rear extention, and uprights carried by the vehicular apparatus and engagable with said extensions in the elevated position of the stacker frame but foldable over the stacker frame in the lowered position of the latter and prior to the folding of its extension.

In testimony whereof he affixes his signature.

CLAUDE D. HOWEY.